No. 709,511. Patented Sept. 23, 1902.
P. REDFORD.
PACKING FOR STUFFING BOXES.
(Application filed July 3, 1901.)
(No Model.)
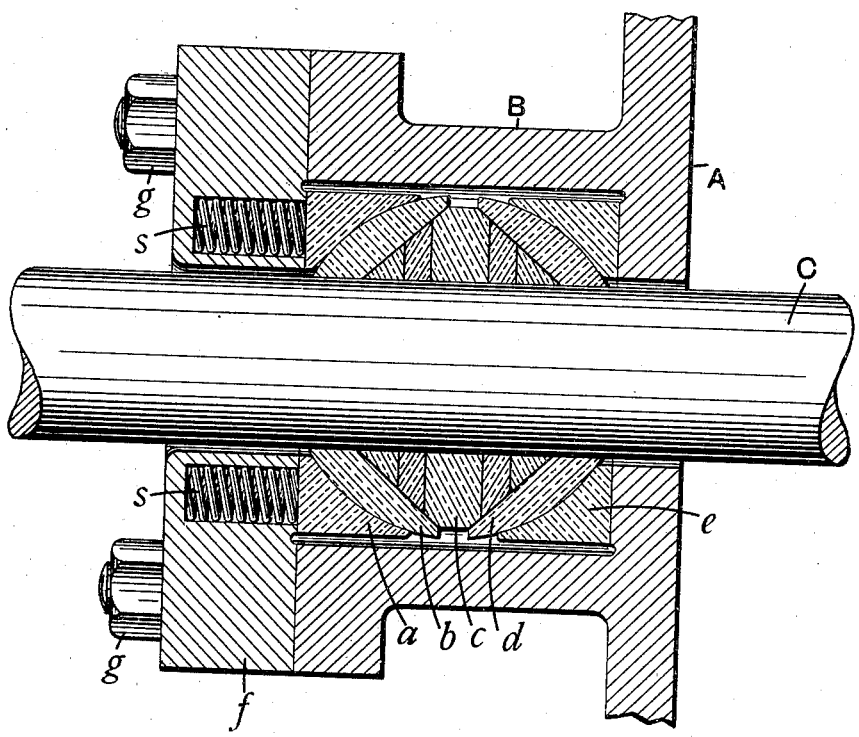
Witnesses
Waldo M. Chapin
Frank S. Ober
Inventor
Percy Redford
by Wm. G. Rosenbaum
atty.

UNITED STATES PATENT OFFICE.

PERCY REDFORD, OF MANCHESTER, ENGLAND.

PACKING FOR STUFFING-BOXES.

SPECIFICATION forming part of Letters Patent No. 709,511, dated September 23, 1902.

Application filed July 3, 1901. Serial No. 66,972. (No model.)

*To all whom it may concern:*

Be it known that I, PERCY REDFORD, a citizen of the British Empire, residing at Manchester, in the county of Lancaster, England, have invented certain new and useful Improvements in Packings for Stuffing-Boxes, of which the following is a full, clear, and exact description.

This invention relates to an improved packing for stuffing-boxes, and is especially adapted for use where leakage cannot be prevented by means of ordinary packings or in connection with steam-engines in which high-pressure steam is used or in which the piston-rod is out of alinement.

My improved packing comprises a metallic spherical shell from which the equatorial zone is removed, thus constituting two nearly hemispherical shells with a removable mass of antifriction metal contained between them and a pair of metallic polar caps fitting upon the shells and upon the bottom and cover of the stuffing-box, respectively. The packing is axially bored for the passage-piston or other rod or equivalent part, and the several rings thus constituted or formed are pressed into contact with each other and with the bottom of the stuffing-box by springs.

I will more fully describe my said invention with reference to the accompanying drawing, which represents my improved packing in longitudinal section as applied to the piston-rod and stuffing-box of a steam-engine.

A indicates part of the engine cylinder-cover, B the stuffing-box, and C a part of the piston-rod. The packing comprises the rings $a$, $b$, $c$, $d$, and $e$, of which $a$, $b$, $d$, and $e$ may be constructed of brass and $c$ of antifriction metal. The rings $b\ c\ d$ are bored to fit upon the rod C, and the rings $a\ e$ to a slightly-larger diameter to permit freedom in working. The outsides of the rings $b\ d$ form portions of a spherical surface fitting within correspondingly-shaped seatings in the polar rings $a\ e$. The antifriction-core $c$ may be in one piece; but it is usually more convenient to form it of a plurality of rings which are transversely divided, so that they may be easily removed and replaced. The inner surfaces of the shells or rings $b\ d$ may be concentric with the outer surfaces; but I have found that better results are obtained in ordinary practice by making these surfaces conoidal, as shown by the drawing. In either case the core $c$ is shaped to fit within the rings $b\ d$.

The bottom of the stuffing-box is surfaced, so that the ring $e$ may fit accurately thereon and so as to be able to move freely.

No gland is shown or is required to be used, and in substitution therefor I employ a cover-plate $f$, the under part of which is surfaced to fit upon the polar ring $a$. This cover-plate is held in position by nuts $g$ on fixed screw-studs or by similar known means. In its under side there are a plurality of recesses containing the springs $s\ s$, which abut upon the ring $a$ and press the elements of the packing in close contact with each other and the ring $e$ in close contact with the bottom of the stuffing-box. These springs, however, may be otherwise constructed and arranged to perform their necessary function.

I find that in use the packing slowly rotates during all the time that the engine is at work, so that its wear is perfectly uniform. If the rod C should be out of alinement, the rings $a\ b$ and $d\ e$ are freely moved one within the other in the manner of a ball-and-socket joint, so that the packing endures no stresses from this cause.

Having particularly described my said invention, I declare that what I claim is—

A stuffing-box packing comprising a spherical structure made up of two hemisherical hollow parts and a separate core confined between them, an axial passage leading through the core and said parts, in combination with two rings having internal spherical surfaces embracing the opposite sides of the spherical structure and having openings in line with said passage, and means for forcing said rings toward each other to thereby press the hollow hemispherical parts against the core, substantially as described.

In witness whereof I have subscribed my signature in presence of two witnesses.

PERCY REDFORD.

Witnesses:
 WILLIAM E. KEYS,
 ARTHUR MILLWARD.